G. E. GARON.
DOWEL CUTTING TOOL.
APPLICATION FILED FEB. 24, 1913.

1,080,209.

Patented Dec. 2, 1913.

WITNESSES
Philip E. Barnes
E. J. Sheehy

INVENTOR
G. E. Garon
by James J. Sheehy & Co., Attorneys

UNITED STATES PATENT OFFICE.

GEORGE E. GARON, OF MANCHESTER, NEW HAMPSHIRE.

DOWEL-CUTTING TOOL.

1,080,209. Specification of Letters Patent. Patented Dec. 2, 1913.

Application filed February 24, 1913. Serial No. 750,353.

*To all whom it may concern:*

Be it known that I, GEORGE E. GARON, citizen of the United States, residing at Manchester, in the county of Hillsboro and State of New Hampshire, have invented new and useful Improvements in Dowel-Cutting Tools, of which the following is a specification.

My present invention pertains to woodworking tools; and it contemplates the provision of a simple, compact and easily operated tool for accurately cutting dowels at the ends of billiard cues, the said dowels being designed to rest in the ivory points usually employed at the ends of billiard cues to prevent splitting of the wood.

Figure 1:
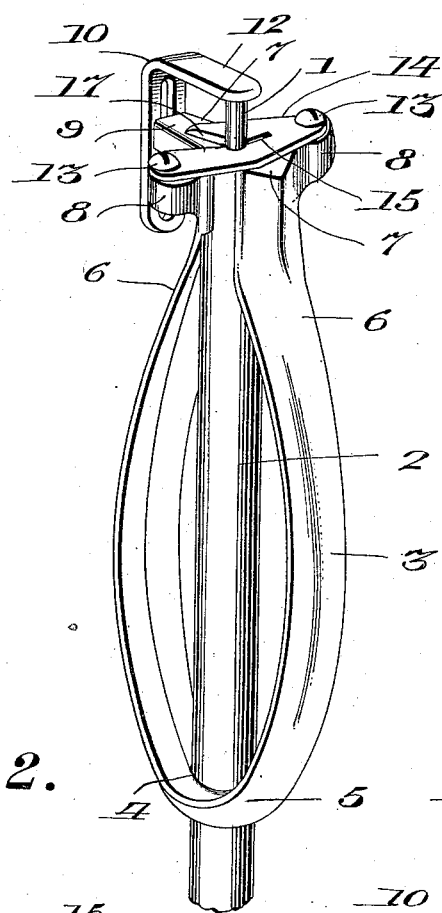
Figure 2:
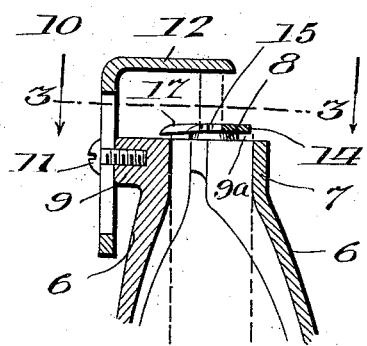
Figure 3:
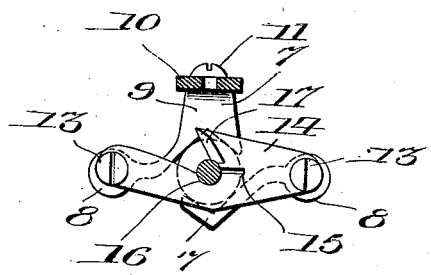

With the foregoing in mind the invention in all of its details will be fully understood from the following description and claims, when the same are read in connection with the drawings, accompanying and forming part of this specification, in which:

Figure 1 is a perspective illustrating the manner in which my novel tool is used to form a dowel at the end of a billiard cue. Fig. 2 is a vertical section taken through the jaws of the tool and showing a billiard cue in dotted lines in proper position to be provided with a dowel. Fig. 3 is a horizontal section taken in the plane indicated by the line 3—3 of Fig. 2, looking downwardly.

Similar numerals of reference designate corresponding parts in all of the views of the drawings.

My novel tool is designed to form a dowel 1, at the end of a wooden billiard cue 2, and among other elements the tool comprises a handle 3, formed of one piece of malleable iron or other metal compatible with its purpose. The said handle 3 is provided in its lower end with an aperture 4, designed to receive the billiard cue, after the manner shown in Fig. 1, and it will be noticed that the handle is in the form of a frame having a base 5, and curvilinear and resilient sides 6. These sides 6 are provided at their upper ends with jaws 7, the inner sides of which are of right-angle form in horizontal section, as best shown in Fig. 3, for an important purpose hereinafter set forth. It will also be observed by comparison of Figs. 1 and 2 that the jaws 7 have lateral projections 8, and that one of the said jaws 7 also has an outwardly directed arm 9. This latter serves for the adjustable connection of a gage 10, which is connected to the arm by a set screw 11, and is provided with an overhanging portion 12. The lateral projections of the jaws 7 are provided with threaded apertures to receive screws 13, through the medium of which the knife 14 is connected to the said projections. As will be observed by reference to the drawings, the knife 14 is split at 15, is provided with a central aperture 16, and is also provided with a cutting edge 17; the latter being arranged as shown relative to the aperture 16, which describes a part of a circle. I would also have it here understood that the knife 14 is loosely mounted on the screws 13, and is therefore adapted to swing to a limited extent about the centers of the said screws 13 which are not tightly set down.

It will be observed by reference to Fig. 2, that the projections 8 extend slightly above the upper ends of the jaws 7, this in order to afford a clearance space 9$^a$ between the underside of the knife 14 and the upper ends of the jaws.

In the practical use of my novel tool, the same is arranged as shown in Figs. 1 and 2 relative to a cue, and the cue is rotated about its axis in the tool or the tool is rotated about the cue until the dowel is formed as shown; the gage 10 serving to regulate the length of the dowel and also to assure the production of a smooth finish at the end of the dowel as is desirable. Incidental to the use of the tool, the resilient sides of the handle are pressed inwardly in order to squeeze and center the cue opposite the knife.

The right angle interior formation of the jaws 7 is advantageous because it enables the jaws to receive cues of different sizes and retain one as well as the other in perfect center opposite the knife so that a dowel can be accurately cut in the center of a small cue as well as in the center of a large cue.

While the screws 13 serve to snugly hold the knife 14 down on the projections 8 of the jaws 7, it will be understood that the screws pivotally connect the knife, and therefore the knife is enabled to move on the screws and projections when the jaws are opened and closed.

In the present and preferred embodiment of my invention, the pivots of the knife are located slightly past the center between the jaws, so that when a cue is driven between the jaws, the knife swings and enables the cutting edge to cut the dowel in the center of the cue.

Having described my invention, what I claim and desire to secure by Letters-Patent, is:

1. In a tool for the purpose described, the combination with a handle formed of a single piece of metal and having an apertured base and resilient sides and also having at the extremities of the sides jaws the interiors of which are of right angle form, and further having lateral projections on the jaws and an outwardly reaching arm on the back of one jaw; of a gage adjustably connected with said arm and having a portion that overhangs the space between the jaws, and a knife pivoted on the projections of the jaws and spaced above the jaws and having a central aperture that describes part of a circle and also having a cutting edge that extends from said aperture.

2. In a tool for the purpose described, the combination of jaws having angular interiors and also having lateral projections, resilient holding means carrying said jaws, a gage carried by one of the jaws and having a portion that overhangs the space between the jaws, and a knife resting opposite said space and pivoted to the projections of the jaws.

3. In a tool for the purpose described, the combination with a handle having an apertured base and resilient opposed sides and also having opposed jaws at the extremities of the sides; of a swinging knife pivoted on the jaws and opposed to the ends thereof.

In testimony whereof I have hereunto set my hand in presence of two subscribing witnesses.

GEORGE E. GARON.

Witnesses:
J. A. BOIVIN,
A. M. GILBERT.

---

Copies of this patent may be obtained for five cents each, by addressing the "Commissioner of Patents, Washington, D. C."